United States Patent
Parsons et al.

[11] Patent Number: 5,809,451
[45] Date of Patent: Sep. 15, 1998

[54] SENSOR PROCESSOR INTEGRATED CIRCUIT

[75] Inventors: Mark Andrew Parsons, Rochester; Canice Patrick Boran, Livonia, both of Mich.

[73] Assignee: Ford Motor Company, Dearborn, Mich.

[21] Appl. No.: 804,590

[22] Filed: Feb. 24, 1997

[51] Int. Cl.[6] .................................................. H03H 25/00
[52] U.S. Cl. ............................................ 702/190; 701/45
[58] Field of Search .................. 364/572, 724.01–724.2, 364/574, 724.011–724.014, 481–487; 341/155–166; 701/45–47

[56] References Cited

U.S. PATENT DOCUMENTS

| | | |
|---|---|---|
| 4,953,089 | 8/1990 | Wolfe .................................. 364/424.05 |
| 5,134,578 | 7/1992 | Garverick et al. ....................... 364/752 |
| 5,220,681 | 6/1993 | Belgin .................................. 455/156.1 |
| 5,477,473 | 12/1995 | Mandl et al. ............................ 364/576 |
| 5,485,393 | 1/1996 | Bradford ................................ 364/483 |
| 5,523,682 | 6/1996 | Leon .................................. 324/207.17 |
| 5,537,869 | 7/1996 | Lopez ..................................... 73/178 R |
| 5,701,253 | 12/1997 | Mayell et al. .......................... 364/483 |

*Primary Examiner*—James P. Trammell
*Attorney, Agent, or Firm*—Peter Abolins; Roger L. May

[57] ABSTRACT

A single chip sensor processor includes an integrated analog to digital converter (A/D) and digital filter. Analog acceleration signals from a sensor is converted and digitally filtered on-chip in parallel with other processor software executions to effectively increases the bandwidth of the system. The results of the sensor processor calculations may be communicated to a remote microcontroller for deploying a vehicle air bag.

9 Claims, 4 Drawing Sheets

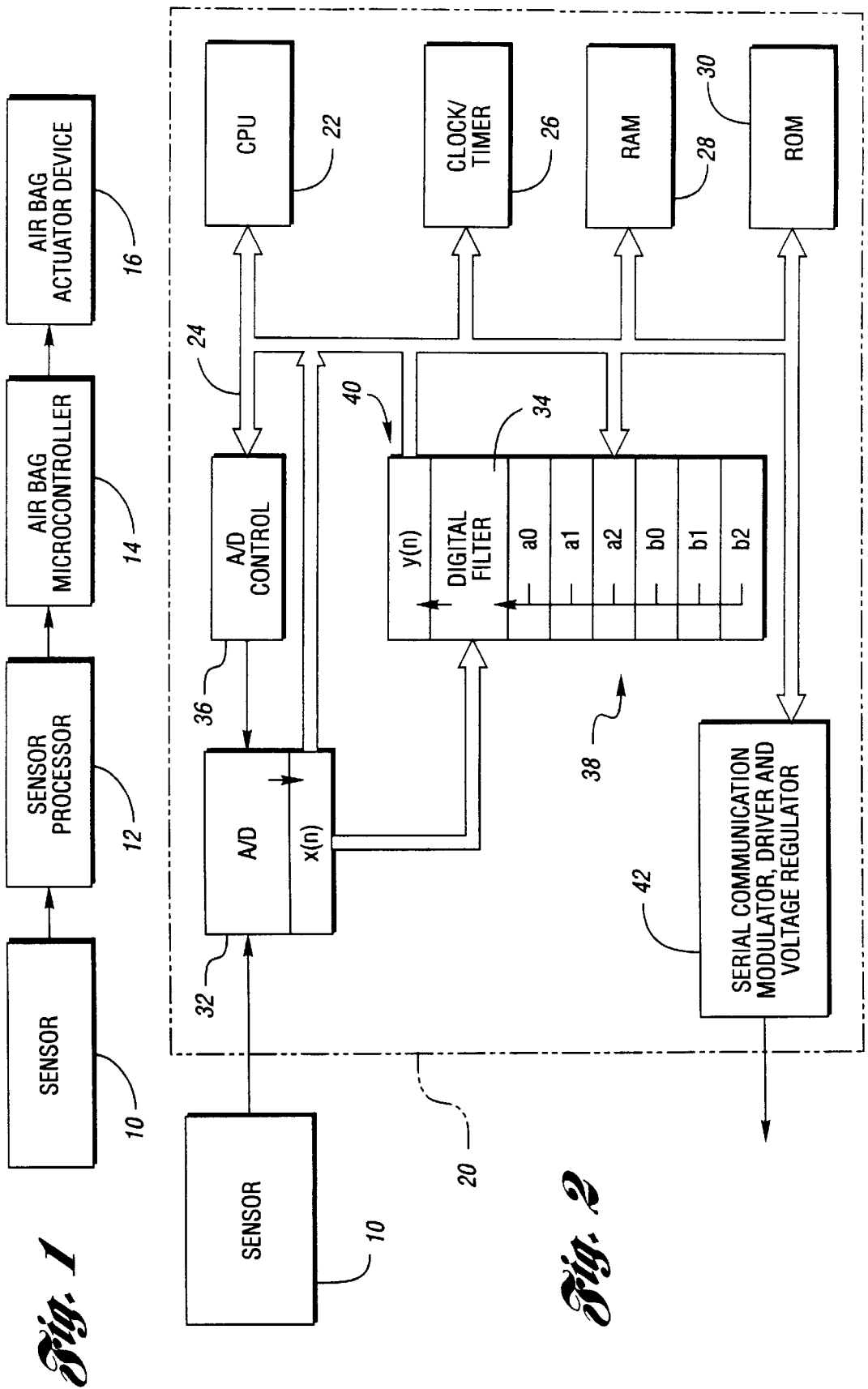

SENSOR PROCESSOR INTEGRATED CIRCUIT

TECHNICAL FIELD

This invention relates to processing of sensor data and, more particularly to a single chip sensor processor including an on-chip digital filter.

BACKGROUND ART

Microcontrollers are used in vehicles for processing data from a sensor such as an accelerometer in order to determine whether an air bag should be deployed. Because of vehicle noise and other high frequency components of the sensor signal, filtering is necessary in order to identify the low frequency crash data necessary to make the decision on air bag deployment.

Implementing a digital filter such as an infinite impulse response (IIR) filter in software places a heavy processing load on the CPU of a microcontroller. There is a need to off-load the filtering requirements of the air bag microcontroller in order to more efficiently process the data from the vehicle acceleration sensor.

SUMMARY OF THE INVENTION

In accordance with the present invention a single chip sensor processor includes an integrated analog to digital converter and digital filter. The converter converts acceleration input data from an analog sensor to digital data and outputs the converted data to the digital filter. The digital filter, preferably an infinite impulse response (IIR) filter receives the converted sensor data at a sampling rate as set by the processor CPU and performs the filtering function in parallel with other processor software executions. This parallel operation effectively increases the bandwidth of the system. The results of the acceleration computation is communicated to a remote air bag microcontroller.

BRIEF DESCRIPTION OF THE DRAWINGS

A more complete understanding of the present invention may be had from the following detailed description which should be read in conjunction with the drawings in which:

FIG. 1 is a block diagram of an air bag deployment system.

FIG. 2 is a block diagram showing the various components included in the sensor processor of the present invention;

DETAILED DESCRIPTION OF PREFERRED EMBODIMENT

Figure 4:
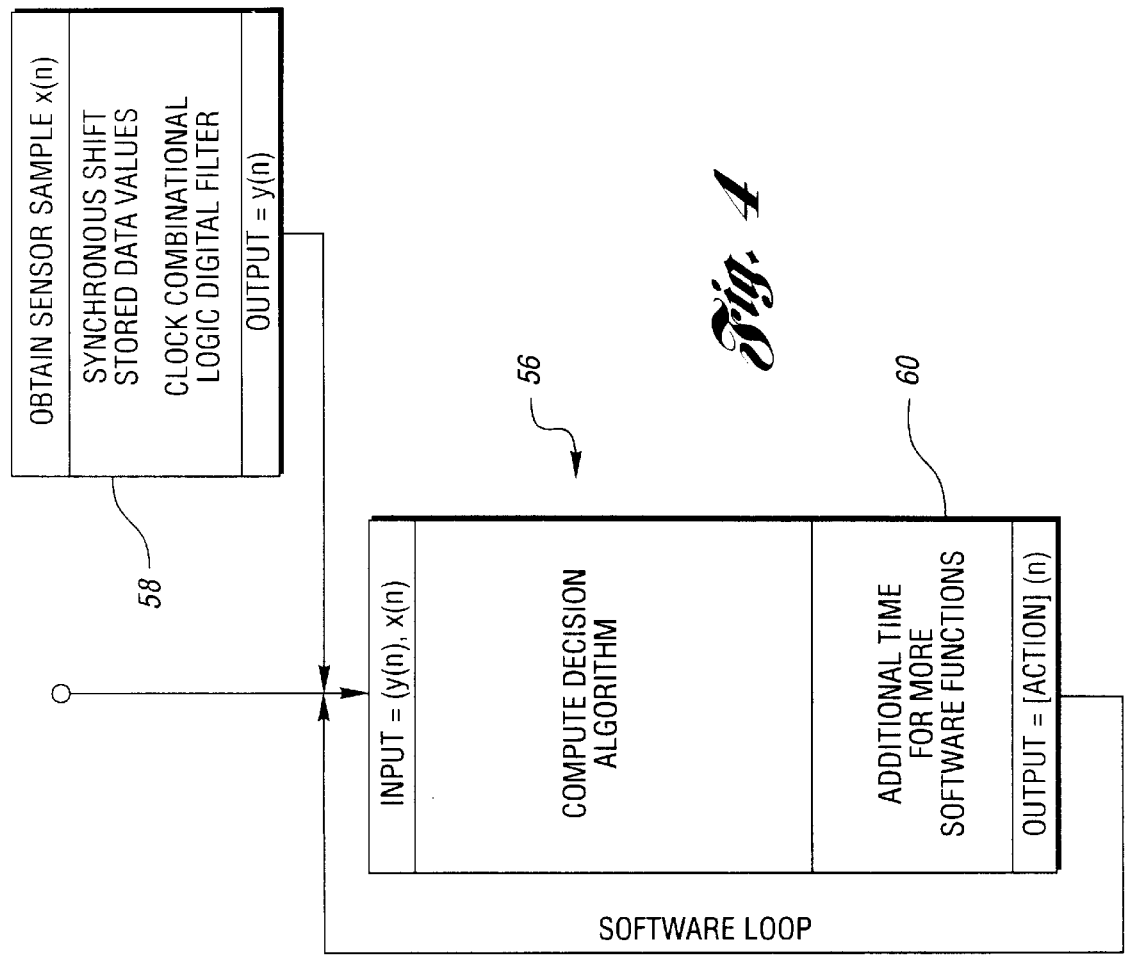
FIGS. 4 and 4a are flowcharts depicting the program of FIGS. 3 and 3a where the digital filtering is performed on-board the sensor processor.

Referring now to the drawings and initially to FIG. 1, an air bag system includes a sensor 10 providing acceleration data to a sensor processor 12 where the acceleration data is processed and communicated to an air bag microcontroller 14. The microcontroller is programmed to energize an actuator or squib to deploy the air bag depending on the processed acceleration data.

Referring now to FIG. 2 the sensor processor 12 is formed as a single integrated circuit or chip generally designated 20.

The chip 20 include a central processing unit (CPU) 22 that communicates through a system bus 24 with a clock/timer block 26, random access memory (RAM) 28, and one time programmable read only memory (ROM) 30. The chip 20 further includes an analog to digital converter (A/D) 32 and a digital filter 34. The operation of the A/D 32 is free-running after initialization by the CPU 22 through settings in an A/D control register block 36 that provides control parameter for the A/D such as sampling rate. After initialization the A/D 32 converts analog data received from the sensor 10 to digital data x(n) without the need for direct control of the conversion process by the CPU 22. The digital data is communicated to the filter 34 for processing by the filter. The sensor 10 is preferably a differential capacitance type sensor such as disclosed in U.S. Pat. No. 5,488,864 assigned to the assignee of the present invention. The filter 34 is preferably an Infinite Impulse Response (IIR) filter and performs calculations on the digital data received from A/D 32 using scaling coefficients loaded from ROM 30 into a plurality of filter parameter registers generally designated 38. The output of the filter calculation is stored in an output register 40 and is available for fetching by the CPU 22.

The IIR filter 34 calculates an output value that is placed in the register 40, based on the present input value plus previous input samples and output results multiplied by scaling coefficients of positive and negative sign. The implementation integrated within the single chip sensor processor uses 8 bit wide sensor data and coefficients for a minimalist implementation. Larger coefficient bit length would allow a greater degree of flexibility in selecting desired filter responses. The general equation implemented by the filter 34 is as follows:

$$y(n)=[b_0 x(n)+b_1 x(n-1)+b_2 x(n-2)-a_1 y(n-1)-a_2 y(n-2)]/a_0$$

where x(n) is the most recently acquired sensor signal data input, x(n-1) is the previous data input sample, x(n-2) is the previous, previous, sample. Y(n-1) and y(n-2) are the previous filter result and previous, previous result, respectively. A typical application requiring a low pass second order autorecursive moving average (ARMA) filter with a corner frequency at approximately 1/10 of the sensor sampling frequency would use the following filter coefficients:

$b_0=36$ $b_1=36$ $b_2=36$ $a_0=256$ $a_2=-256$ $a_2=108$

A serial communication modulator block 42 provides a modulated output to the microcontroller 14 representing the result of CPU computation based on the acceleration sensed by the sensor 10.

One of the primary advantages of integrating the digital filter 32 on the processor chip 20 is the increased time available for software execution. Since the sensor signal's filter calculations are performed in parallel with the normal software execution, the software processing bandwidth of the system is increased. This is illustrated in FIGS. 3, 3a, 4, and 4a.

Figure 3:
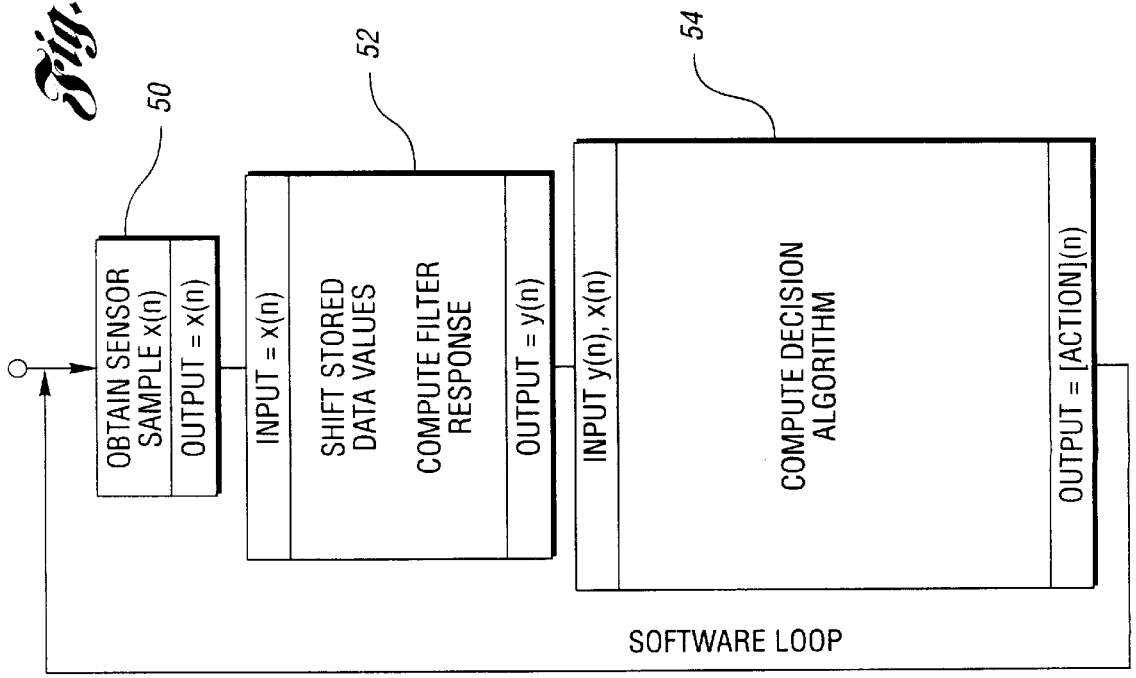
FIGS. 3 and 3a are flowcharts depicting a program incorporating a software implementation of the IIR filter.

Referring initially to FIG. 3, a typical sensor processing system samples sensor analog signal data by periodically performing an analog-to-digital conversion on the data. The sampling repetition rate is known as the sampling frequency. The step of obtaining a sample is shown in the block 50. This digital sample is operated on by a digital filter algorithm, in software, in the block 52. The calculation involves shifting old data (or rotating cyclical pointers) and performing the multiplications, additions, subtractions, and divisions necessary to obtain the resultant output value y(n).

Figure 3A:
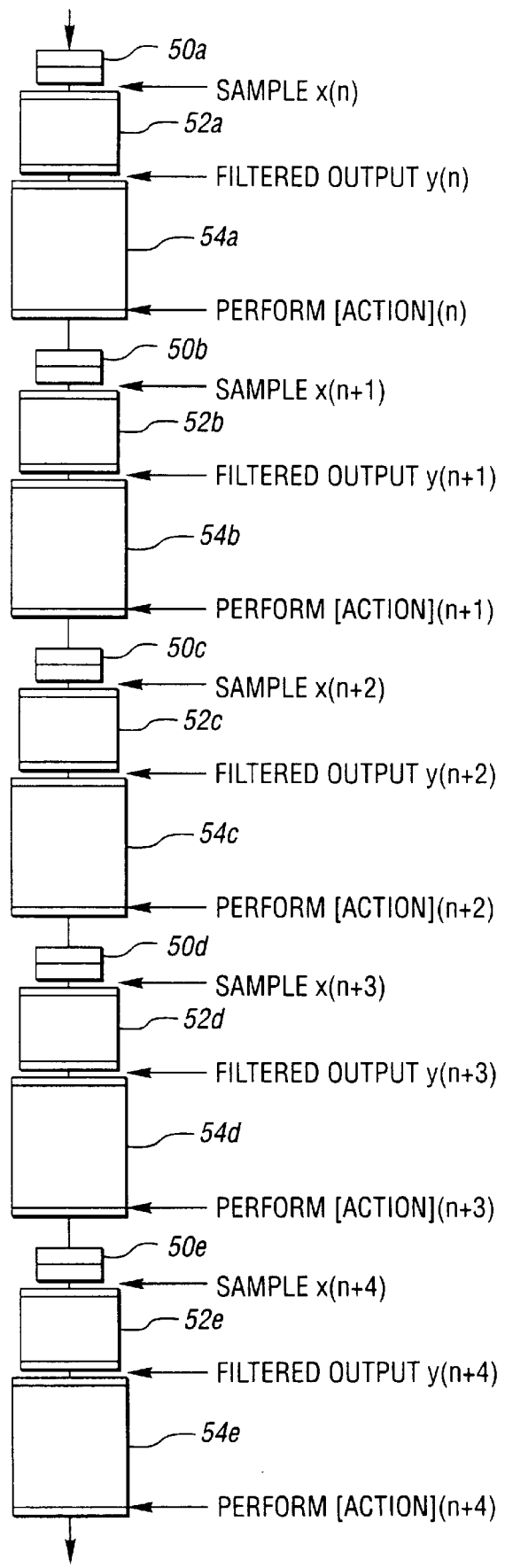

In block 54 the software decision algorithm selects the appropriate actions to be taken based on the results of the filtered sensor signal. This block includes calculations necessary to extract, or determine, information from the signal that can be compared to high or low limits, expected values, or other decisive criteria. All of this software execution must be performed within the time between sensor signal sampling. It is generally not allowed to vary or alter the sampling frequency when processing real-time functions. FIG. 3a depicts five sequential epochs 50a–54a to 50e–54e, with the corresponding sample and action points noted.

Referring now to FIG. 4 the software execution in accordance with the present invention is devoted entirely to the decision algorithm and is indicated at 56. The sensor signal is pre-processed by the on-chip hardware logic at 58, to produce both the current sample, x(n), and the current filtered result, y(n). These results are immediately available to the software flow via data transfer registers such as the output register 38 typically employed in microcontrollers. The zone 60 indicates the additional time allocated to algorithm processing that had been used for software filtering in FIG. 3.

Figure 4A:
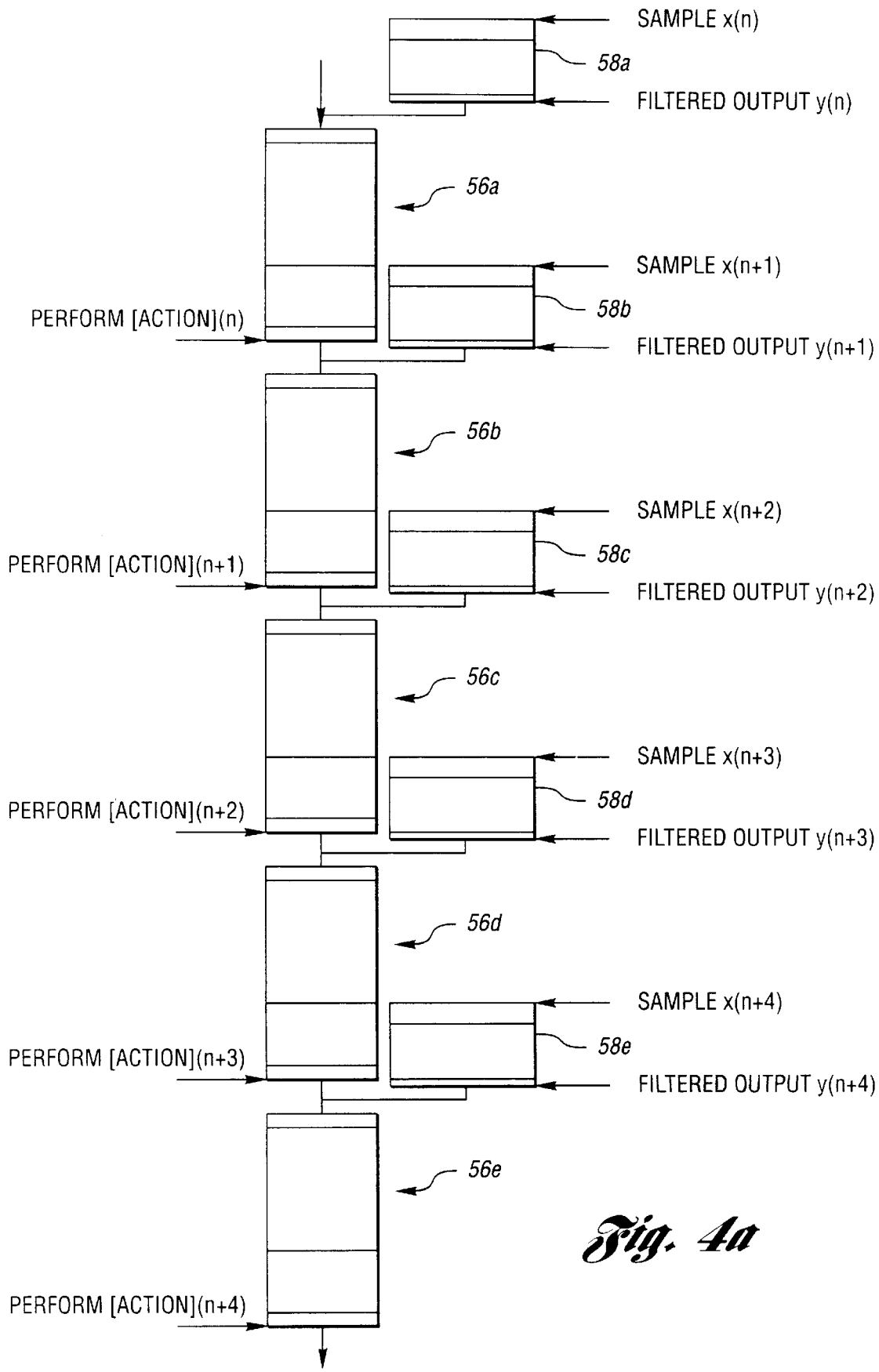

In FIG. 4a, the five epochs are again illustrated for comparison with FIG. 3a. The software decisive algorithm is shown to the left, and the sensor signal sampling and subsequent filtering is shown on the right. The signal sampling and filter execution at blocks 58a–58e is performed independently of software execution indicated generally at 56a–56e. Upon completion of a filter calculation, the filter hardware indicates "data ready" by asserting an interrupt to the software flow. This leaves nearly the entire time between samples devoted to algorithm processing.

While the best mode for carrying out the present invention has been described in detail, those familiar with the art to which this invention relates will recognize various alternative designs and embodiments for practicing the invention as defined by the following claims. For example, while the invention is described as using a low pass second order autorecursive moving average (ARMA) filter other filters for realization of bandpass, high pass etc. may be employed where appropriate. Also, while a single filter is disclosed, a plurality of such filters, interacting as desired, and providing data ready for software processing may be included where the application renders such modifications desirable.

What is claimed is:

1. A sensor processor formed of a single integrated circuit comprising a central processing unit (CPU), read only memory storing a program, an analog to digital converter for converting analog input data from a sensor to digital data, a digital filter for filtering said digital data in parallel with execution of program functions by said CPU, a plurality of filter parameter registers accessible by said filter and said CPU for storing filter parameter values to be used in filtering said digital data, and an output register accessible by said filter and said CPU for storing the result of a filter operation.

2. The processor of claim 1 further comprising a serial communication modulator for developing a modulated output of said sensor processor for transmission to a host processor, said host processing using said data to determine whether to deploy an air bag.

3. The processor of claim 1 wherein said digital filter is a low pass infinite impulse response filter.

4. The processor of claim 3 wherein the filtering operation is of the form:

$$y(n)=[b_0 x(n)+b_1 x(n-1)+b_2 x(n-2)-a_1 y(n-1)-a_2 y(n-2)]/a_0$$

where x(n) is the most recently acquired sensor signal data input, x(n−1) is the previous sample, x(n−2) is two samples prior to the most recent. Y(n−1) and y(n−2) are the previous filter result and second previous result, respectively, and $a_0$, $a_1$, $a_2$, $b_0$, $b_1$, $b_0$ are filter coefficients.

5. In combination, an analog sensor providing an output corresponding to an input stimulus, a programmable sensor processor formed as a single integrated circuit including a digital filter, an analog to digital converter responsive to sensor output and providing digital data to said filter, said filter providing filtered data corresponding to said sensor output and processor means for processing said filtered data to provide processed output data corresponding to said input stimulus, said converter being initialized by said processor means and thereafter converting data without intervention by said processor means, said digital filter filtering said digital data in parallel with execution of program functions by said processor means.

6. The combination of claim 5 wherein said digital filter is a low pass infinite impulse response filter.

7. The combination of claim 6 further including a programmable microcontroller responsive to the output of said sensor processor for controlling the actuation of a device.

8. The combination of claim 7 wherein said device is an air bag installed on a motor vehicle, and said sensor is responsive to vehicle acceleration.

9. A system for controlling the deployment of an air bag installed on a motor vehicle, comprising:

a vehicle acceleration sensor providing an analog output signal;

sensor processor formed of a single integrated circuit including a central processing unit (CPU), read only memory storing a program, an analog to digital converter for converting analog input data from said sensor to digital data, said converter being initialized by said CPU and thereafter converting data without intervention by said CPU and providing storage of said data in a converter output register, a low pass infinite impulse response digital filter for filtering said digital data in parallel with execution of program functions by said CPU, a plurality of filter parameter registers accessible by said filter and said CPU for storing filter parameter values to be used in filtering said digital data, a filter output register accessible by said filter and said CPU for storing the result of a filter operation, said filter operation being of the form:

$$y(n)=[b_0 x(n)+b_1 x(n-1)+b_2 x(n-2)-a_1 y(n-1)-a_2 y(n-2)]/a_0$$

where x(n) is the most recently acquired sensor signal data input, x(n−1) is the previous sample, x(n−2) is two samples prior to the most recent. Y(n−1) and y(n−2) are the previous filter result and second previous result, respectively, and $a_0$, $a_1$, $a_2$, $b_0$, $b_1$, $b_0$ are filter coefficients;

a serial communication modulator for developing a modulated output;

a programmable microcontroller responsive to said modulated output for controlling the deployment of said air bag.

\* \* \* \* \*